United States Patent

[11] 3,615,649

| [72] | Inventors | Roger C. Parish<br>King of Prussia;<br>John E. Trei, Malvern, both of Pa. |
|---|---|---|
| [21] | Appl. No. | 881,915 |
| [22] | Filed | Dec. 3, 1969 |
| [45] | Patented | Oct. 26, 1971 |
| [73] | Assignee | Smith Kline & French Laboratories<br>Philadelphia, Pa. |

[54] METHOD AND COMPOSITIONS FOR IMPROVING FEED EFFICIENCY OF RUMINANTS USING POLYHALO-HEMIACETAL DERIVATIVES OF SACCHARIDES
21 Claims, No Drawings

[52] U.S. Cl.................................................. 99/2 R,
424/180, 99/2 G, 260/233.3, 260/209 R
[51] Int. Cl.................................................. A23k 1/16
[50] Field of Search............................................ 99/2, 2 N, 2 M, 14, 17, 2 G; 424/180, 333, 350; 260/601 H, 609, 615 A, 633, 209, 233.3

[56] References Cited
UNITED STATES PATENTS

| 2,784,180 | 3/1957 | Tislow et al.................... | 260/209 |
| 2,784,237 | 3/1957 | Bruce.......................... | 260/615 |

OTHER REFERENCES

Pictet et al., Chemical Abstracts, vol. 17, 1923 p. 3018-3019.
Meyer et al., Chem. Ber., vol. 85, 1952 p. 590
Baker et al., Chemical Abstracts, vol. 69, 1968 p. 11600 W.

*Primary Examiner*—Norman Yudkoff
*Assistant Examiner*—Kenneth P. Van Wyck
*Attorneys*—William H. Edgerton, Richard D. Foggio, Joan S. Keps, Alan D. Lourie and Joseph A. Marlino

ABSTRACT: Polyhalohemiacetal derivatives of saccharides and especially polysaccharides improve the feed efficiency of commercial ruminant animals by inhibiting methanogenesis in the rumen. The derivatives are inexpensive to prepare and have no unpleasant taste, odor or stability problems. A preferred compound is the chloral-starch condensation product which may be added to whole feed, used as a premix or in salt blocks.

METHOD AND COMPOSITIONS FOR IMPROVING FEED EFFICIENCY OF RUMINANTS USING POLYHALOHEMIACETAL DERIVATIVES OF SACCHARIDES

This invention comprises new ruminant feed compositions and new methods of producing greater feed efficiency in ruminants using polyhalohemiacetal derivatives of saccharides and polysaccharides. The term "acetal" in combination or separately is used herein to mean derived from acetaldehyde. More specifically the active ingredients may be described as the condensation products of polyhaloacetaldehydes with saccharides more specifically sugars such as glucose or glucose containing polymers which have an available reactive hydroxy group. More specifically the preferred compounds are starch-chloral condensation products.

Improvement of the feed efficiency of ruminant animals is an important commercial objective. If the cow or sheep grows more on the same or less feed the cost of meat per pound to the farmer is decreased. In a copending application Ser. No. 881,868 filed Dec. 3, 1969 to which reference under Rule 78 is given, we described our finding that low doses of haloacetaldehydes and their derivatives improved the feed efficiency of ruminant animals without causing overt therapeutic activity or without inhibiting the overall fermentation activity of the rumen. The low doses of haloacetaldehyde derivatives per os effectively inhibit methanogenesis in the rumen probably by interrupting the methylcobalamine to methane plus vitamin $B_{12}$ cycle thereby concerving energy source mediators such as ATP for more productive work. The net effect in the rumen is to reduce the production of methane and to produce a higher ratio of the desirable fatty acids especially propionic and butyric acids. These are more efficiently utilized by the ruminant to increase the efficiency of rumen digestion of feed.

The active condensation products of the present invention have been surprisingly found to be very active. In addition they are completely odorless and stable. They also have the property of gradually releasing of the active polyhaloacetaldehyde ingredient to give and maintain a relatively even concentration of active ingredient in the rumen throughout the digestive process. Of course the products are easily prepared from low cost, nontoxic chemical starting materials.

The chemical starting materials used to prepare the active ingredients of this invention are the polyhaloacetaldehydes which are the active moieties in the end product and the saccharide or preferably polysaccharide which may be characterized as the carrying portion of the hemiacetal.

The polyhaloacetaldehyde has the formula $CX_3CHO$ in which X is hydrogen or halo, that is chloro or bromo, at least two of which are halo. The hydrates also react in the condensation.

The saccharide portion may be a monomer such as glucose which forms $\alpha$ or $\beta$-chloraloses, which also may react with more than 1 mole of aldehyde, to give hemiacetal compounds of activity, formula I in which Z is 0 and Y is 1. Most useful are the polysaccharides which are glucans in which Z plus Y are from 10-5000. The exact condensation product does not necessarily have to be precisely known since the polysaccharide and polyhaloacetaldehyde are allowed to react to form a hemiacetal at all available hydroxy groups, then any nonchemically bound aldehyde is removed. The product is then analyzed for chlorine content and used in proportion to chloral equivalents present from the active portion of the hemiacetal. If a polysaccharide does not react with the polyhaloacetaldehyde it obviously is not a suitable carrying moiety.

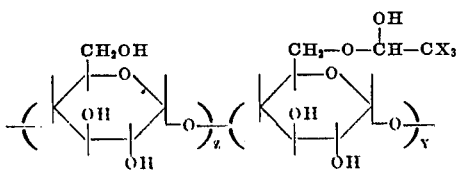

Formula 1

It is possible that full acetal formation with 2 moles, or, more likely, a single mole of polyhaloacetaldehyde is present. Also reaction at the other two secondary hydroxy groups rather than at the more reactive primary hydroxyl is possible, especially under forcing conditions such as prolonged heat or acid catalysis.

The most useful aldehyde reactant is chloral. The most useful polysaccharide ingredient is starch or more specifically Starch U.S.P. Most useful are hemiacetal starches containing the structure of formula I in which Z and Y is from about 100-2000.

The number of hemiacetal units per anhydroglucose unit while important to biological activity on a weight basis may vary widely with retention of activity. For example with cellulose the percent of chloral units present may be from 5-10% based on chlorine analysis while in certain monosaccharide chloral hemiacetals i.e. derived from mannitol the chloral content may approach 75-80%. The active dose levels are therefore based on chloral content as measured by chlorine content using analysis of chemically bound chloral. The amount of substitution in products such as those of formula I may be defined as the DS (Degree of Substitution) factor. This is a term commonly used in this art. For example, in an anhydroglucose unit such as is found in a polysaccharide such as amylose substitution may vary from none (DS 0) to all three of the available hydroxy groups substituted (DS 3). In highly polymeric polysaccharides the DS value reflects a statistically average value of the degree of substitution. A typical average composition of 1 polyhaloaldehyde unit per 4 units of anhydroglucose in a polymer has a DS value of 0.25. We have found that polymeric hemiacetals having DS values of from about 1.0 to about 0.25 are most useful because of their ease of preparation but this invention is not limited to this range. The DS may range as high as 5 in some cases.

As stated above the saccharide component or the carrying unit of the condensation products may range from the simple monosaccharides such as glucose (and mannitol), to disaccharides such as sucrose to longer chain saccharides to cyclic polysaccharides such as the Schardinger dextrin to saccharides such as the various starches, dextrins, corn syrup or celluloses. The preferred compounds, the starches, are the commercially available ones, U.S.P., corn, potato, tapioca, sorghum, wheat rice and others. The fractions derived from starches are also most useful such as amylose, amylopectin or amylodextrin. Synthetic modifications of such carrying units may also be used such as the anhydrosugars, glycosides, modified starches or cellulose for example carboxymethylcellulose, methyl cellulose, oxidized cellulose. The carrying unit may be in some cases a component of a natural feed such as finely ground corn, the glucan content of which can be reacted to form a polyhalohemiacetal. It will be recognized by those skilled in the art that the preferred carrying polysaccharides will have a low degree of cross linking in order to allow adequate condensation of the available saccharide hydroxy groups with the polyhaloacetaldehyde.

Reference may be had to standard texts such as "Polysaccharide Chemistry" by Roy L. Whistler et al. Academic Press, 1953 or L. A. Radley "Starch and its Derivatives" Wiley 1954 for other examples of carrying polysaccharides.

Certain of the condensation products which are the active ingredients of the claimed methods and compositions are known in the art. See K. H. Meyer et al. Chem. Ber. 85 590 (1952); R. Tislow et al. U.S. Pat. No. 2,784,180; G. V. Balis et al. Pharmacologia, 6 1 (1964); J. H. Ross, J. Am. Chem. Soc. 45, 2363 (1923); A. Pictet et al. Helv. Chim. Acta 6 621 (1923). To our knowledge there is no mention in the literature of the use of the active ingredients described above for improving the feed efficiency of ruminants. References in the prior art react chloral with starch or cellulose-like polysaccharides under hydrolytic conditions resulting in the isolated products being glucochloraloses in most cases.

The long chain chloral-starch hemiacetals are preferred over those derived from monomer or short chain polysaccharides because their slower rate of degradation and release of the active moiety in the rumen permit their use over a wide range of dose regimens without undesirable therapeutic or antifermentation activity.

The active and preferred ingredients, the starch-chloral hemiacetals are most readily prepared by the reaction of chloral hydrate with U.S.P. starch at reflux in benzene with stirring. The insoluble white condensation product forms, is separated and dried in vacuo to remove nonchemically bound chloral. The structure of the preferred product prepared in this manner is that of formula I above in which the $DS=Z/Y = \sim 0.35$. As stated Z and Y may be from 100–2000 although this figure is not critical.

The preferred chlorine levels of the condensation products are from about 10–35% depending on the ease of preparation and the stability of the desired hemiacetal. Most preferred is a range from about 15–20% chlorine. Actually the highest chlorine containing material which can be prepared easily and is stable is most desirable.

Alternatively other products may be made with or without heating, solvents or catalysts such as a mineral acid. Generally speaking these chemical reactions are similar to those described in the chemical examples hereafter.

The unit amounts hereafter or in the claims are expressed in amounts of chloral units since this is the preferred active aldehyde ingredient unless clearly expressed to the contrary. Other polyhalohemiacetal or polysaccharide carrying units to be used in feed products may be easily calculated from these by those skilled in the art.

The ruminant feeds most generally used in conjunction with the method of this invention are the roughage feeds such as silage or various commercial grain mixtures commonly used in ruminant animals, that is, in cattle or sheep. The amount of additive here will be an amount sufficient to improve the feed efficiency of the animal but not to have a pharmacodynamic effect; in the range of about 1 g. to 1 Kg. per ton of feed (about 0.001–0.1%) preferably from about 100–400 g./ton based on chloral content since the saccharide carrying portion of the condensation product is not active. An average sheep will ingest about 3–4 lbs. of food daily. An average cow about 25 lbs.

Most useful quantities of the preferred U.S.P. starch-chloral hemiacetal ingredient will run from about 40 g.–3 Kg. (5 lbs.) per ton preferably 400 90–2 Kg./ton. An average 80 lb. sheep will ingest about 0.4–4 g. of this active ingredient daily dispersed in its feed. An average 1000 lb. cow about 4–8 g. Note these are weights of hemiacetal.

Generally speaking the preferred starch-chloral hemiacetal with a DS of 0.35 is one-fourth chloral equivalent.

For commercial use, the active ingredients are most readily used as premix formulations in which the chemical is distributed uniformly throughout a standard animal feed carrier. This premix or concentrate is then mixed with either a normal or a special fattening diet of the ruminant as desired. Examples of such carriers are soybean meal, corn oil, ground corn, barley, wheat, mineral mixtures such as vermiculites, diatomaceous earth, corn gluten meal, corn distillers solubles or soyflour. The active-ingredient will be in amounts to satisfy the criteria set forth above for whole feed. The active ingredient will usually be present in from about 5–75% by weight of the premix composition depending largely on the physical properties of the ingredient.

The animal feeds themselves may also contain cellulosic roughage such as cellulose, hay, straw, corn stalks, cotton seed hulls, oats, barley, and cereal brans; natural oils such as animal fats, fish oils, and whale oil; vegetable oils such as soybean oil, olive oil, safflower oil, peanut oil, and cottonseed oil; antioxidants; minerals; vitamins; antibiotics; anthelmintics; and other appropriate medicaments.

A typical prepared animal feed is as follows:

| | |
|---|---|
| Mixed hay | 40.0% |
| Ground yellow corn | 45.0 |
| Soybean oil meal | 7.0 |
| Cane molasses | 7.0 |
| Dicalcium phosphate | 0.5 |
| Trace minerals salt | 0.5 |
| Vitamin A | 300 I.U./lb. |
| Vitamin D | 150 I.U./lb. |
| Chloral-USP starch | 1 lb./ton of feed |

An example of a suitable premix is as follows:

| | |
|---|---|
| Chloral starch | 2 lb. |
| Ground yellow corn | to 3 lb. |

This mix may be added to a ton of feed.

Another might be a 50—50 mixture of chloral-starch and vermiculite.

In the field the active ingredients may be administered by means of salt or molasses blocks. A typical block may be prepared using the following conditions:

| Ingredient | Weight Percent |
|---|---|
| Dried cane molasses | 44.54 |
| Ground soybean hulls | 14.90 |
| Chloral-starch | 15.00 |
| Granulated salt | 21.59 |
| Trace minerals and vitamins | 0.20 |
| Stabilized animal fat | 1.11 |
| Moisture | 2.66 |

The method of this invention comprises allowing the cattle or sheep to feed ad libidum on the supplemented rations or to be fed under pen conditions on a regular schedule.

Normally the greatest feed efficiency is realized from using the method and composition of this invention on rough fodder or normal grain feeding. However, we have found feed efficiency increases of from about 5–15% using normal fattening diets and conditions, the most rigorous test possible.

The ability of the polyhaloacetaldehyde-saccharide hemiacetal derivatives of this invention to improve feed utilization in ruminants is primarily evaluated by means of a test which measures in vitro methane gas production as an indicator of the rate of fermentation of feedstuffs by micro-organisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gases are sampled by hypodermic needle from the flask and run through a gas partitioner (column chromatography) which separates and quantitates the components. The liquids (volatile fatty acids, etc.) are analyzed by gas liquid chromatography. Among the products measured are carbon dioxide, hydrogen, and fatty acids having from two to six carbon atoms. Reduction in the percent methane produced of 20% is considered significant. However, with compounds used in the present invention, reduction of 90–100% without reduction of overall fermentation is not uncommon. Ability of a particular compound to reduce the amount of methane generated without adversely reducing the overall rate of fermentation is determined by comparing the total ($\mu$ moles/ml.) volatile fatty acids produced in control systems with those containing test compound. We have found that one can use 20–100 times the concentration of compound which is effective in inhibiting methanogenesis before the fermentation rate is significantly affected. Also significant is the distribution of fatty acids obtained.

The effect of the polyhaloacetaldehyde polysaccharide derivatives of this invention in reducing methane production without causing a reduction in the rate of overall fermentation at effective concentrations, when tested by the above procedures, is shown by the data below.

A predetermined molar or percent concentration of test compound in water or ethanol was administered usually in 0.1, 0.5 or 1.0 cc. portions as described above. The data in table I is for parts of active ingredient per amount of rumen fluid, i.e., parts per million with resulting significant methane inhibition.

TABLE I

|  | p.p.m. | % Methane reduction |
|---|---|---|
| α-chloralose (DS = 1) | 40 | 90 |
| β-chloralose (DS = 1) | 130 | 50 |
| Glucose-chloral product (DS = 2) | 13 | 75 |
|  | 65 | 95 |
| Chloral-corn syrup (% Cl = 18.15) | 13 | 60 |
|  | 65 | 95 |
| Chloral-methylcellulose (% Cl = 9.2) | 65 | 50 |
|  | 325 | 75 |
|  | 650 | 90 |
| Chloral-ground corn (% Cl = 1.2) | 1300 | 40 |
| Chloral-cellulose (% Cl = 0.35) | 650 | 50 |
|  | 1300 | 70 |
| Preferred starch-chloral group | | |
| % Cl | | |
| 1.2 | 520 | 56 |
| 4.2 | 52 | 43 |
|  | 260 | 91 |
| 6.8 | 52 | 65 |
|  | 260 | 87 |
| 19.3 | 52 | 85 |
| 21.0 | 52 | 91 |
| 32.1 | 13 | 46 |
| Reference: chloral hydrate | 22 | 80 |

The results of in vitro tests which correlate methane inhibition with a desired shift in ratio of fatty acid production in the rumen to the more easily metabolized higher congeners especially propionate is presented in table II. This represents an analysis of rumen content evaluated statistically results from the substantially complete inhibition of rumen methanogenesis by the derivatives noted above which is achievable using this invention.

TABLE II

|  | Molar % | |
|---|---|---|
|  | Controls | Treated |
| $C_2$ fatty acids | 54–57 | 50–52 |
| $C_3$ fatty acids | 21–23 | 25–28 |
| $C_4$ fatty acids | 15–18 | 19–22 |
| $C_5$ or higher fatty acids | remainder to 100% | remainder to 100% |
| Total u moles/ml. | 68–72 | 67–74 |

The in vitro data presented above was confirmed by in vivo tests as follows:

Each dose level value represents a test group of four head of pinhole fistulated sheep. The animals were fed the additive mixed with morning and evening feed in quantities so that 90% ad libidum amounts were administered. The sheep would eat all the supplemented food in 1 hour. The results ran for a 7-day period.

Samples were withdrawn from the rumen 4–5 hours after feeding and again 12–15 hours after the evening feeding. Analysis of the samples by gas partitioner and G.L.C. for gas and fatty acid content were carried out.

The in vitro and in vivo results detailed above were confirmed in trials in feeder sheep under field conditions. The drug tested was chloral-starch hemiacetal (DS ~ 0.3, Cl analysis 15.8, 15.3%).

TABLE III

|  | Control | | 750 mg./1.2 Kg. Feed Chloral-starch (~0.5) 22% chloral hydrate equivalent | |
|---|---|---|---|---|
|  | % Methane | Molar % VFA | % Methane | Molar % VFA |
|  | 49.0 | | 2* | |
| $C_2$ | | 51.7 | | 36.7* |
| $C_3$ | | 30.5 | | 41.5* |
| $C_4$ | | 17.7 | | 20.8* |
| $C_5$ | | to 100% | | to 100% |
| Total VFA's um./ml. | | 51 | | 53 |

*(P>0.05) significant change from controls.

Properly prepared 75 lb. Texas feeder lambs were fed a pelleted ration of:

|  | % w/w |
|---|---|
| Mixed ground hay | 40.0 |
| Soybean meal 50% | 7.0 |
| Dried molasses 87% | 8.0 |
| Dicalcium phosphate | 0.5 |
| Trace mineral salt | 0.5 |
| Ground corn | 44.0 |
| Vitamin A 300 units/lb. | |
| Vitamin D 150 units/lb. | |

Two pens of 18 head/pen were fed each dose level blind with 4 pens held as control. All animals were fed once a day. Feed weight consumed and 30 day body weights measured. Total test time reported 60 days.

Combined figures for 60 days were as follows:

|  | Avg. Net Food Consumed | Avg. Wt. Gain | Avg. Food/Wt. Gain |
|---|---|---|---|
| Control | 1771.45 | 227.79 | 7.78 |
| 4 lb./ton | 1649.38 | 232.08 | 7.11* |
| 2 lb./ton | 1727.27 | 236.85 | 7.31* |
| 1 lb./ton | 1756.33 | 233.57 | 7.52* |

*Significant increase with 4 lb./ton level approximately 9% gain in feed efficiency.

EXAMPLE 1

Starch (Eastman, water soluble, 200 g.), chloral hydrate (100 g.) and benzene (150 ml.) are heated at reflux with stirring for 1 hour in a 120° C. bath. Water is removed by azeotropic distillation for 5 hours until the distillate is clear. The solid white product is dried at 60° C. in vacuo; 18.39% Cl., D.S.=0.35–0.4. The azeotropic distillation may be omitted if desired.

This product is mixed with equal weight of vermiculite, then the premix is mixed with the feed of sheep being fattened at a rate of 4 lbs./ton.

EXAMPLE 2

Starch (U.S.P., 10.0 g.) and anhydrous chloral (3.0 ml.) are mixed and heated to 120° C. during one-half hour. After 2 hours at 120° C., the product is cooled, pulverized and dried at 60°–70° C. in vacuo. The product analyzed for 23.26% Cl. D.S.= ~ 0.5.

This product is mixed with feed of cattle being pen fed at the rate of 1 lb./ton.

Starch (U.S.P., 10 g.) and anhydrous bromal is reacted by the same procedure to give the bromal starch hemiacetal which is used at 2 lb./ton.

Starch (U.S.P., 10 g.) and 2,2,3-trichlorobutryaldehyde are reacted by the procedure to give the hemiacetal which is used at 5 lb./ton.

EXAMPLE 3

Starch (U.S.P., 10 g.) and dichloroacetaldehyde (5.0 g.) are mixed and heated at 100° C. for 3 hours. The product was dried in vacuo at 100° C.; 20.3% Cl.

This product is given at the rate of 2 lb./ton to improve the feed efficiency of hay diet cattle.

EXAMPLE 4

Methylcellulose (U.S.P., 50.0 g.) and anhydrous chloral (25 g.) are heated in an oil bath at 110° C. for 6 hours. The product is dried at 110° C. in vacuo then ground to a fine powder; 9.2% Cl.

This material is mixed with feed at the rate of 8 lbs./ton for cattle feed.

EXAMPLE 5

Starch (U.S.P., 5 g.) and chloral hydrate (50 g.) are heated at 100° C. with stirring for 19 hours. The product is poured into 30 ml. of methanol and diluted with 100 ml. of ethyl ether. The white product is separated and dried at 100° C. in vacuo; 23.25% Cl., D.S.= ~ 0.525.

This material is mixed with ruminant feed at the rate of 2 lb./ton.

EXAMPLE 6

Starch (Eastman water soluble, 10 g.) and 2,2,2-trichloro-1-ethoxy ethanol (chloral ethanolate, 5 g.) are mixed with 1 ml. of 6N hydrochloric acid and heated at 120° C. for 1 hour. The product, a brown syrup, is triturated with 50 ml. of acetone then separated and dried; 7.29% Cl., D.S.,=~0.125.

This material is mixed with feed at 5 lb./ton.

EXAMPLE 7

Cellulose powder ("Avicel" PH-101, 20 g.), chloral hydrate (10 g.), 18N sulfuric acid (0.2 ml.) and benzene (150 ml.) are heated with stirring at reflux for 27 hours. The product is separated, washed and dried in vacuo for 18 hours at 100° C.; 4.50% Cl., D. S. =~0.075.

This material is used at 10 lb./ton.

EXAMPLE 8

Finely ground dried corn is dried further in vacuo at 100° C. for 7 hours. The corn (35.0 g.) and anhydrous chloral (18.0 g.) are heated at 110° C. for 18 hours. Nonreacted chloral is evaporated and the product dried; 1.2% Cl.

This material is used at 30 lb./ton.

EXAMPLE 9

Light corn syrup (Karo, 21.8 g.) and anhydrous chloral (8.0 g.) are heated at 100° C. for 12 hours. The syrup product is dried at 100° C. in vacuo to give a white solid dextran chloral adduct; 18.15% Cl.

This material is used at 4 lb./ton.

We claim:

1. The method for improving the feed utilization of ruminant animals comprising administering as an active ingredient to such animals an effective but nontoxic quantity of a polychloro or polybromohemiacetalsaccharide derivative of the formula:

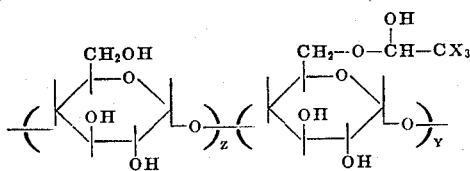

in which Z/Y is from about 0.25 to 1.0 and X is selected from the group consisting of hydrogen and a halogen, either chlorine or bromine, at least two of X's being halogens.

2. The method of claim 1 in which the chlorine content of the hemiacetalsaccharide derivative is from about 10-35%.

3. The method of claim 1 in which the quantity of active ingredient is about 40 g.–3 Kg. per ton of feed.

4. The method of claim 1 in which the active ingredient is the chloral hemiacetal of starch.

5. The method of claim 2 in which the active ingredient is the chloralhemiacetal derivative of starch in amounts of about 100-400 g./ton of feed, based on chloral content.

6. The method of claim 1 in which the active ingredient is the chloralhemiacetal of starch with a chlorine content of about 10-35%.

7. The method of claim 1 in which the active ingredient is the chloralhemiacetal of starch with a Z/Y ratio of about 0.35.

8. The method of claim 6 in which the chlorine content of the active ingredient is from about 15-20%.

9. An animal feed supplemented by a quantity of polychloro or polybromohemiacetalsaccharide derivative as defined in claim 1.

10. The animal feed of claim 9 in which the quantity of said saccharide derivative is about 40 g.–3 Kg. per ton.

11. The animal feed of claim 9 in which the saccharide derivative is chloralhemiacetal starch.

12. The animal feed of claim 11 in which the quantity of active ingredient is from about 400 g.–2 Kg./ton.

13. The animal feed of claim 9 in which the saccharide derivative is chloralhemiacetal starch of chlorine content of from about 15-20% in a quantity of from about 400 g.–2 Kg./ton.

14. A premix feed containing a quantity of active ingredient as defined in claim 1 dispersed in an edible animal feed.

15. A premix feed containing a quantity of active ingredient as defined in claim 2 dispersed in an edible animal feed.

16. A premix feed containing a quantity of active ingredient as defined in claim 3 dispersed in an edible animal feed.

17. A premix feed containing a quantity of active ingredient as defined in claim 4 dispersed in an edible animal feed.

18. A premix feed containing a quantity of active ingredient as defined in claim 5 dispersed in an edible animal feed.

19. A premix feed containing a quantity of active ingredient as defined in claim 6 dispersed in an edible animal feed.

20. A premix feed containing a quantity of active ingredient as defined in claim 7 dispersed in an edible animal feed.

21. A premix feed containing a quantity of active ingredient as defined in claim 8, said starch being U.S.P. grade dispersed in an edible animal feed.